United States Patent Office 2,929,673
Patented Mar. 22, 1960

2,929,673

CUPRIFEROUS DISAZO-DYESTUFFS

Hans Luzi Schucan, Bettingen, Switzerland, assignor to Ciba Limited, Basel, Switzerland, a Swiss firm No Drawing. Application January 26, 1956
Serial No. 561,691

Claims priority, application Switzerland February 10, 1955

10 Claims. (Cl. 8—26)

This invention provides cupriferous disazo-dyestuffs

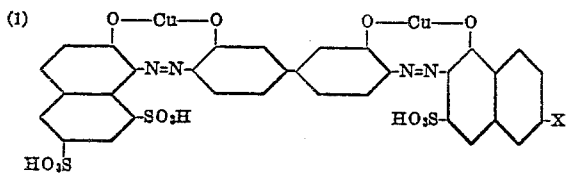

which, in the form of free acids, correspond to the formula:

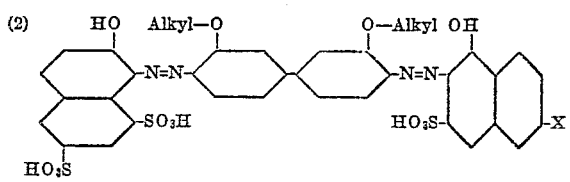

in which X represents an

—NH(CO)$\overline{n}$R group, R standing for a monocyclic aromatic radical and $n$ for a 1 or 2, viz. X represents a phenylamino or benzoylamino group which may contain substituents, and which dyestuffs contain as the sole groups imparting solubility in water the sulfonic acid groups shown in the formula.

This formula undoubtedly indicates the correct stoichiometric proportion of copper and the correct position of the copper atoms in the complex, but the distribution of the main and secondary valences in the complex union of the copper is not up to the present known with certainty.

The invention also provides a process for the manufacture of the above cupriferous disazo-dyestuffs, wherein a disazo-dyestuff which, in the form of the free acid, corresponds to the general formula (2)
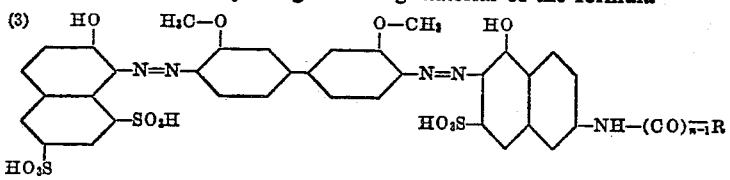

in which X has the meaning given above, and which dyestuff contains as the sole groups imparting solubility in water the three sulfonic acid groups shown in the formula, is treated with an agent yielding copper under conditions such that the formation of the ortho:ortho'-dihydroxy-azo-copper complex is accompanied by splitting up of the —O-Alkyl groups.

The disazo-dyestuffs used as starting materials in the present process can be made, for example, by coupling a tetrazotized 3:3'-dialkoxy-4:4'-diaminodiphenyl, especially dianisidine, in either order of succession, on one side, with a 2-phenylamino- or 2-benzoylamino-5-hydroxynaphthalene-7-sulfonic acid which is free from further groups imparting solubility in water and may contain further substituents in the benzene radical and, on the other side, with 2-hydroxy-naphthalene-6:8-disulfonic acid. The amino group of the 2-amino-5-hydroxynaphthalene-7-sulfonic acid may either be an unsubstituted phenylamino- or benzoylamino-group or, for example, a methylphenylamino, para-methoxyphenylamino, para-chlorophenylamino or chlorobenzoylamino group.

Especially valuable dyestuffs of this invention are obtained by using a starting material of the formula (3)
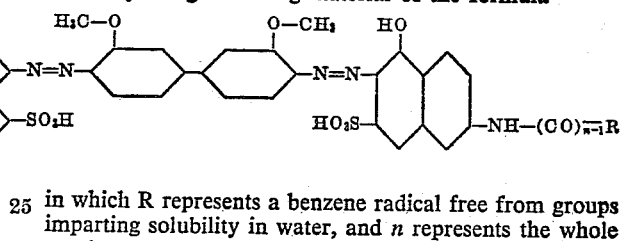

in which R represents a benzene radical free from groups imparting solubility in water, and $n$ represents the whole number 1 or 2.

The following are a few examples of derivatives of 2-amino-5-hydroxynaphthalene-7-sulfonic acid, which can be used in the manner described above with the other components to give starting materials which yield valuable dyestuffs as the result of the coppering treatment:

2-phenylamino-5-hydroxynaphthalene-7-sulfonic acid,
2 - (para - methylphenylamino) - 5 - hydroxynaphthalene-7-sulfonic acid,
2 - (para - chlorophenylamino) - 5 - hydroxynaphthalene-7-sulfonic acid,
2 - (para - methoxyphenylamino) - 5 - hydroxynaphthalene-7-sulfonic acid,
2-benzoylamino-5-hydroxynaphthalene-7-sulfonic acid,
2 - (para - chlorobenzoylamino) - 5 - hydroxynaphthalene-7-sulfonic acid,
2 - (2':4' - dichlorobenzoylamino) - 5 - hydroxynaphthalene-7-sulfonic acid.

The treatment of the disazo-dyestuffs of the Formulae 2 and 3 with an agent yielding copper is carried out under conditions such that the formation of the ortho:ortho'-dihydroxy-azo-copper complex is accompanied by splitting up of the alkoxy groups, especially methoxy groups, present in the diaminodiphenyl component. Methods for carrying out this dealkylating coppering treatment are known. Especially advantageous in many cases is the process in which the coppering is carried out for one or several hours in the vicinity of 100° C. in an aqueous medium with the use of a copper tetrammine complex and in the presence or absence of an excess of ammonia. In some cases it is especially advantageous to use the process of Patent No. 2,536,957, granted January 2, 1951, to Henri Riat et al., in which the process is carried out in the presence of an hydroxyalkylamine, especially ethanolamine, or a copper complex derived therefrom.

Complex copper compounds, which are obtained from disazo-dyestuffs of the formula (4)
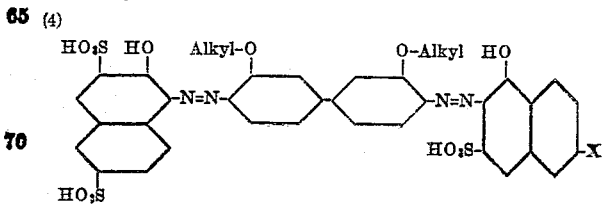

in which X has the meaning given above, generally have the disadvantage that they flocculate out in concentrated dye liquors and have poor levelling properties with respect to natural and regenerated cellulose fibers. It could not be expected that the dyestuffs of this invention would not also exhibit this disadvantage. Even dyestuff mixtures which consist of at least 40% of a dyestuff of the Formula 1 and at most 60% of a copper complex obtained by a dealkylating coppering treatment of a disazodyestuff of the Formula 4, exhibit no flocculation phenomena and yield good level dyeings on cellulose fibers. Such mixtures can be obtained by a dealkylating coppering treatment of a mixture of dyestuffs of the Formulae 3 and 4 in the aforesaid proportions or by mixing together the preformed metalliferous dyestuffs in those proportions, or by coppering a mixture of dyestuffs obtained by coupling the tetrazo-component with a mixture of 2-hydroxynaphthalene-6:8-disulfonic acid and -3:6-disulfonic acid.

The cupriferous disazo-dyestuffs of this invention are useful for dyeing and printing a very wide variety of materials, for example, silk, but especially fibers of natural or regenerated cellulose. There are obtained blue to navy blue tints having generally good properties of fastness, and especially a very good fastness to light, which properties of fastness withstand the usual anti-creasing treatments, for example, with a urea-formaldehyde artificial resin. These dyestuffs are also useful in dyeing cellulosic fabrics by the continuous method, in which the fiber is treated over its entire surface with an aqueous mixture of alkaline to neutral reaction, which contains a complex nickel compound or advantageously a complex copper compound, of a direct-dyeing azo-dyestuff and an amine containing at least two amino groups separated by two carbon atoms from hydroxyl groups, and the dyestuffs are then fixed on the fabric so treated in a non-aqueous medium.

The new dyestuffs are especially suitable for producing navy blue tints on cellulosic fibers owing to their good affinity for these fibers, and in this connection it is especially noteworthy that the dyestuffs can be made from relatively simple and easily accessible starting materials.

The following examples illustrate the invention, the parts and percentages being by weight:

*Example 1*

73 parts of 4:4'-diamino-3:3'-dimethoxydiphenyl are tetrazotized in a solution of 185 parts of hydrochloric acid of 30 percent strength in 1000 parts of water by the addition of 41.6 parts of sodium nitrite. The solution so obtained is poured in the course of 10 minutes at about 6° C. into a solution of 52 parts of 2-hydroxynaphthalene-6:8-disulfonic acid and 40 parts of 2-hydroxynaphthalene-3:6-disulfonic acid in 1000 parts of water, and which latter solution has been adjusted to a pH value of 7 to 8 by the addition of sodium carbonate. By the addition of further sodium carbonate the pH value is then adjusted to 9 to 10. After half an hour the suspension of the monoazo-dyestuff is poured into a solution, having an alkaline reaction to Brilliant Yellow paper, of 108 parts of 2-benzoylamino-5-hydroxynaphthalene-7-sulfonic acid in about 1500 parts of water at 10° C. 100 parts of ammonia solution of 24 percent strength are then added dropwise in the course of 2 hours. After stirring the mixture for 4 hours at 10–12° C. the coupling is complete. In order to convert the disazo-dyestuff into its complex copper compound, there are added to the reaction mixture 300 grams of ammonia solution of 24 percent strength, 150 parts of copper sulfate and 90 parts of monoethanolamine, and the whole is heated for 12 hours at 85–90° C. The dark blue copper complex is precipitated by salting out. It dyes cotton and regenerated cellulose reddish navy blue tints of excellent fastness to light.

A similar, but somewhat more reddish navy blue dyeing dyestuff, is obtained by using 92 parts of 2-hydroxynaphthalene-6:8-disulfonic acid, instead of the aforesaid mixture of 2-hydroxynaphthalene-6:8- and -3:6-disulfonic acid.

In either of the procedures of the first and second paragraphs of this example the second coupling may be carried out with 113.5 parts of 2-(4'-chlorobenzoylamino)-5-hydroxynaphthalene-7-sulfonic acid, and there are likewise obtained cupriferous dyestuffs which dye cellulose fibers navy blue tints.

*Example 2*

73 parts of 4:4'-diamino-3:3'-dimethoxydiphenyl are tetrazotized in a solution of 185 parts of hydrochloric acid of 30 percent strength in 1000 parts of water at 0–4° C. by the addition of 41.6 parts of sodium nitrite. The solution so obtained is poured in the course of 10 minutes at about 6° C. into a solution of 91 parts of 2-hydroxynaphthalene-6:8-disulfonic acid in 1000 parts of water, which solution has been adjusted to a pH value of 7 to 8 by the addition of sodium carbonate. By the addition of a further quantity of sodium carbonate the pH value is adjusted to 9 to 10. After ½ hour the suspension of the monoazo-dyestuff is poured into a solution, having an alkaline reaction to Brilliant Yellow paper, of 104 parts of 2-phenylamino-5-hydroxynaphthalene-7-sulfonic acid in about 1500 parts of water. 100 parts of ammonia solution of 24 percent strength are added dropwise in the course of 2 hours, and the whole is stirred for 4 hours at 10–12° C. The conversion of the disazo-dyestuff into the copper compound may be carried out as described in Example 1. The dyestuff is isolated by salting out and filtration, and dyes cotton and regenerated cellulose strong navy blue tints of very good fastness to light.

Dyestuffs having similar properties are obtained by using, instead of 2-phenylamino-5-hydroxynaphthalene-7-sulfonic acid, 115 parts of 2-(4'-chlorophenylamino)-5-hydroxynaphthalene-7-sulfonic acid or 113.5 parts of 2-(4'-methoxyphenylamino)-5-hydroxynaphthalene-7-sulfonic acid.

*Example 3*

100 parts of cotton are entered at 40° C. into a dyebath which contains in 3000 parts of water 1.5 parts of the dyestuff obtained as described in the first paragraph of Example 1. Dyeing is carried on for ½ hour while the temperature is raised to 90° C., 40 parts of crystalline sodium sulfate are added, and dyeing is continued for a further ½ hour at 90–95° C. The cotton is then rinsed and finished in the usual manner. It is dyed a fast reddish navy blue tint.

What is claimed is:

1. A cupriferous disazo dyestuff which in its free acid state corresponds to the formula

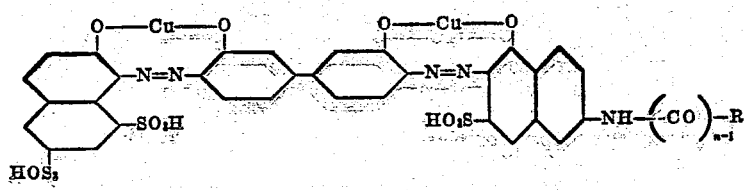

in which R represents a mononuclear carbocyclic aromatic radical free from groups imparting water-solubility, and n represents a whole number of at most 2.

and which dyestuff contains in admixture a cupriferous disazo dyestuff which in its free acid state corresponds to the formula (II)
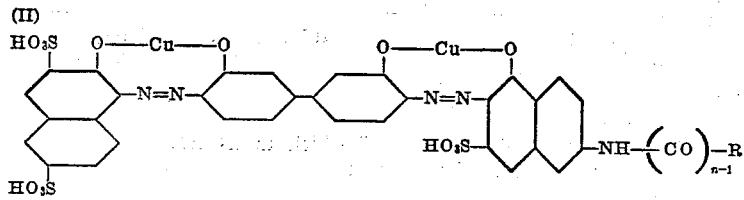

2. A cupriferous disazo dyestuff which in its free acid state corresponds to the formula

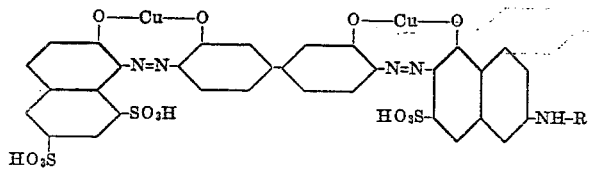

in which R represents a mononuclear carbocyclic aromatic radical free from groups imparting water-solubility.

in which formulae R represents a mononuclear carbocyclic aromatic radical free from groups imparting water-solubility, and n represents a whole number of at the most 2, the quantity of the dyestuffs I and II considered together being such that the mixture contains at least 40% of dyestuff I and at most 60% of dyestuff II.

5. A cupriferous disazo dyestuff which in its free acid state corresponds to the formula (I)
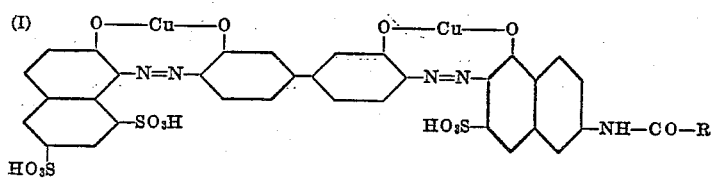

and which dyestuff contains in admixture a cupriferous disazo dyestuff which in its free acid state corresponds to the formula (II)
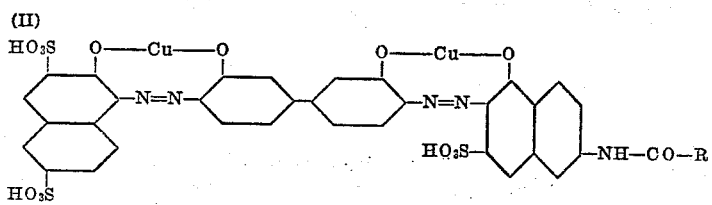

3. A cupriferous disazo dyestuff which in its free acid state corresponds to the formula

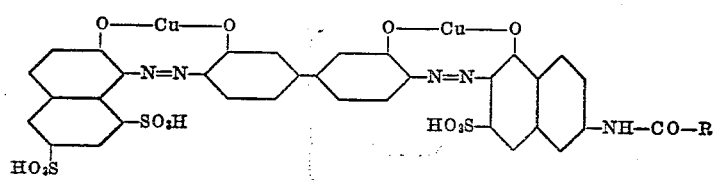

in which R represents a mononuclear carbocyclic aromatic radical free from groups imparting water-solubility.

4. A cupriferous disazo dyestuff which in its free acid state corresponds to the formula (I)
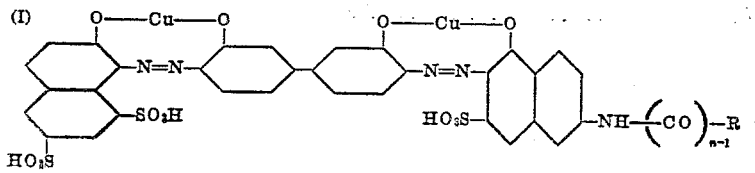

in which formulae R represents a mononuclear carbocyclic aromatic radical free from groups imparting water-solubility, the quantity of the dyestuffs I and II considered together being such that the mixture contains at least 40% of dyestuff I and at most 60% of dyestuff II.

6. The cupriferous disazo dyestuff which in its free acid state corresponds to the formula

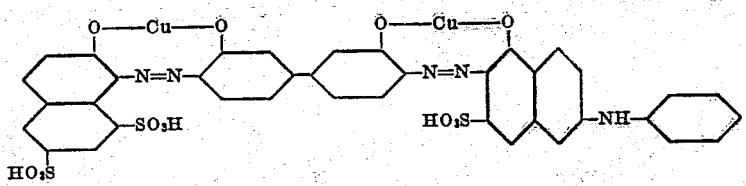

7. The cupriferous disazo dyestuff which in its free acid state corresponds to the formula

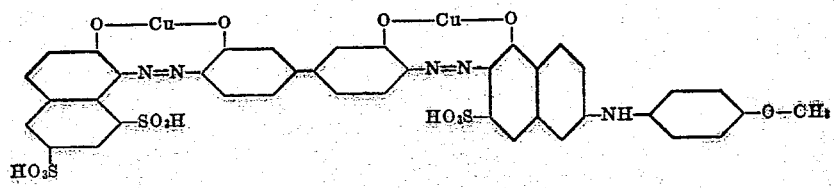

8. The cupriferous disazo dyestuff which in its free acid state corresponds to the formula

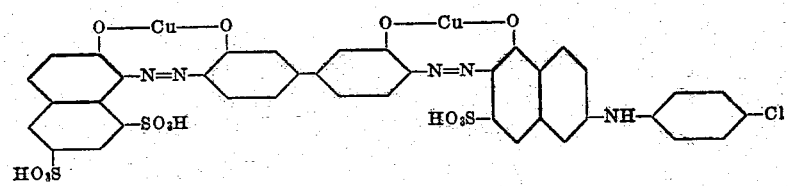

9. A cupriferous disazo dyestuff which in its free acid state corresponds to the formula

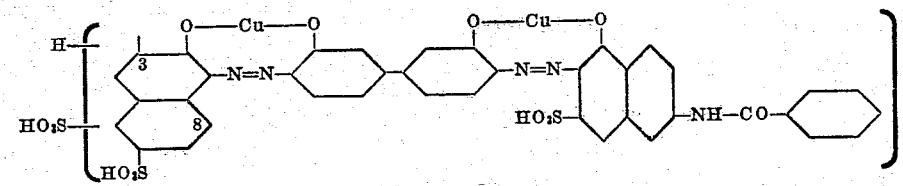

of which dyestuff from 40% to 100% contain the sulfonic acid group in 8-position and at most 60% contain the sulfonic acid group in 3-position of the terminal naphthalene nucleus.

10. A cupriferous disazo dyestuff which in its free acid state corresponds to the formula

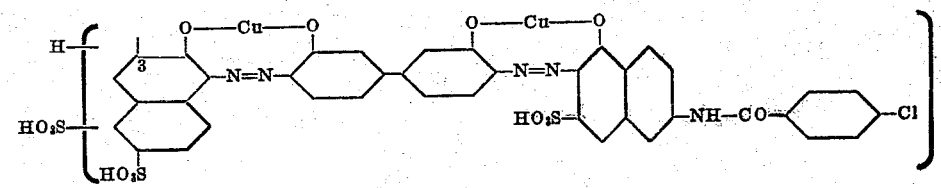

of which dyestuff from 40% to 100% contain the sulfonic acid group in 8-position and at most 60% contain the sulfonic acid group in 3-position of the terminal naphthalene nucleus.

References Cited in the file of this patent
UNITED STATES PATENTS

| | | |
|---|---|---|
| 1,889,732 | Stusser et al. | Nov. 29, 1932 |
| 2,668,167 | Monnier | Feb. 2, 1954 |
| 2,714,588 | Keller | Aug. 2, 1955 |
| 2,817,656 | Bissell | Dec. 24, 1957 |

UNITED STATES PATENT OFFICE
CERTIFICATE OF CORRECTION

Patent No. 2,929,673                                          March 22, 1960

Hans Luzi Schucan

It is hereby certified that error appears in the printed specification of the above numbered patent requiring correction and that the said Letters Patent should read as corrected below.

Column 1, line 42, after "for" strike out "a"; column 7, claims 9 and 10, the left-hand portion of the formulas, each occurrence, should appear as shown below instead of as in the patent:

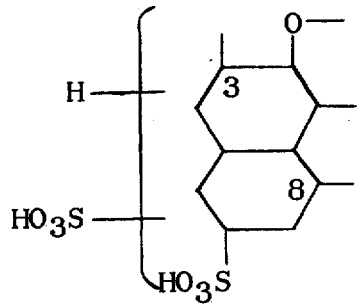

Signed and sealed this 30th day of August 1960.

(SEAL)
Attest:

ERNEST W. SWIDER                                ROBERT C. WATSON
Attesting Officer                               Commissioner of Patents